(12) United States Patent
Bystrov et al.

(10) Patent No.: US 10,134,142 B2
(45) Date of Patent: Nov. 20, 2018

(54) OPTIMIZATION OF PARAMETERS FOR SEGMENTING AN IMAGE

(71) Applicant: KONINKLIJKE PHILIPS N.V., Eindhoven (NL)

(72) Inventors: Daniel Bystrov, Hamburg (DE); Heinrich Schulz, Hamburg (DE); Torbjoern Vik, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 169 days.

(21) Appl. No.: 15/314,527

(22) PCT Filed: Jun. 11, 2015

(86) PCT No.: PCT/EP2015/062994
§ 371 (c)(1),
(2) Date: Nov. 29, 2016

(87) PCT Pub. No.: WO2015/189303
PCT Pub. Date: Dec. 17, 2015

(65) Prior Publication Data
US 2018/0268549 A1    Sep. 20, 2018

(30) Foreign Application Priority Data

Jun. 12, 2014  (EP) .................................. 14172124

(51) Int. Cl.
*G06T 7/12*   (2017.01)
*G06T 7/194*  (2017.01)
(Continued)

(52) U.S. Cl.
CPC .............. *G06T 7/12* (2017.01); *G06K 9/6267* (2013.01); *G06T 7/0012* (2013.01); *G06T 7/194* (2017.01);
(Continued)

(58) Field of Classification Search
CPC combination set(s) only.
See application file for complete search history.

(56) References Cited

U.S. PATENT DOCUMENTS 6,404,936 B1   6/2002  Katayama et al.
7,502,521 B2 * 3/2009  Sun .......................... G06T 5/005
                                                        345/582
(Continued)

OTHER PUBLICATIONS

Martin, V. et al., "A cognitive vision approach to image segmentation", "Tools in artificial intelligence", 208, InTech Education and Publishing, Abstract.
(Continued)

*Primary Examiner* — Tsung-Yin Tsai

(57) ABSTRACT

The present invention relates to a device for segmenting an image (12) of a subject (14) comprising a data interface (16) for receiving an image (12) of said subject (14) and at least one contour (18) or at least one part of a contour (18), said contour (18) indicating a structure (19) within said image (12), a selection unit (20) for selecting a region (22) in said image (12) divided into a first and a second disjoint part (24, 26) by said contour (18) or said part of said contour (18), said selected region (22) comprising a drawn region and/or a computed region, a classifier (28) for classifying said selected region (22) based on at least one parameter for image segmentation, an analysis unit (29) for defining an objective function based on the classification result, an optimizer (30) for optimizing said parameter set by varying an output of said objective function and an image segmentation unit (32) for segmenting said image (12) using said optimized parameter set.

13 Claims, 2 Drawing Sheets

(51) Int. Cl.
  *G06T 7/00* (2017.01)
  *G06T 11/00* (2006.01)
  *G06K 9/62* (2006.01)

(52) U.S. Cl.
  CPC ... *G06T 11/005* (2013.01); *G06T 2207/20112* (2013.01)

(56) References Cited

U.S. PATENT DOCUMENTS

| | | |
|---|---|---|
| 7,869,648 B2 | 1/2011 | Schiller et al. |
| 2008/0260221 A1 | 10/2008 | Unal et al. |
| 2010/0022489 A1 | 1/2010 | Hyde et al. |
| 2013/0033419 A1 | 2/2013 | Dror et al. |
| 2013/0034276 A1* | 2/2013 | Hibbard ............. G06T 17/30 382/128 |

OTHER PUBLICATIONS

Kerr, W.B., et al., "A methodology and metric for quantitative analysis and parameter optimization of unsupervised, multi-region image segmentation", Proceeding of the 8th IASTED International Conference on Signal and Image Processing, Aug. 14, 2006, pp. 243-248.

Zhou, W., et al., "Interactive contour delineation and refinement in treatment planning of image-guided radiation therapy", Journal of Applied Clinical Medical Physics, vol. 15, No. 1, 2014.

Lankton, S. "Localizing region-based active contours", Image Processing, IEEE Transaction on (vol. 17, Issue: 11) 2008. Abstract.

* cited by examiner (A)  (B)  (C)

OPTIMIZATION OF PARAMETERS FOR SEGMENTING AN IMAGE

CROSS-REFERENCE TO PRIOR APPLICATIONS

This application is the U.S. National Phase application under 35 U.S.C. § 371 of International Application Serial No. PCT/EP2015/062994, filed on Jun. 11, 2015, which claims the benefit of European Patent Application No. 14172124.1, filed on Jun. 12, 2014. These applications are hereby incorporated by reference herein.

FIELD OF THE INVENTION

The present invention relates to a device, system and method for segmenting an image of a subject. It finds application in software-based interactive image analysis, in particular for radiation therapy treatment planning.

BACKGROUND OF THE INVENTION

In the field of medical imaging, image segmentation is the process of partitioning a digital image into multiple segments of image elements being pixels or voxels. For the purpose of image based medical analysis, medical treatment planning or for the improvement of the visualization or context based navigation in medical images image segmentation is an indispensable technology. For instance, for radiation therapy treatment planning image segmentation is important to prevent radiosensitive anatomical structures from damage.

There exist different ways of segmenting images. For instance, threshold or appearance based segmentation algorithms, segmentation algorithms based on atlas registration or shape model based segmentation algorithms.

Among all the image segmentation methods, interactive image segmentation techniques are required if automatic methods are not available for certain segmentation tasks or if results of automatic segmentation algorithms need manual corrections. For instance, one accepted technique for interactive image segmentation is manual contouring of image slices. In contrast to automatic image segmentation, which is usually only possible for certain anatomical structures, interactive image segmentation provides higher user flexibility. For instance, it can be utilized in conjunction with different imaging modalities and/or specific imaging protocols.

US 2010/022489 A1 discloses a computer-implemented method of segmenting images comprising the steps of receiving an image, generating a segment of the image based on initial segmentation parameters, classifying the features of the generated segment and generating at least one revised segmentation parameter. Further, a contour of interest can be extracted and a different contour can be produced when the segmentation parameters are varied.

Vincent, Martin et al., "A Cognitive Vision Approach to Image Segmentation", "Tools in Artificial Intelligence", 208, InTech Education and Publishing, pp. 265-294, discloses a framework for manual segmentations of training images with closed outlined regions. In particular, the framework includes defining a segmentation quality function and optimizing a parameter set by minimizing or maximizing the segmentation quality function.

EP 1 526 481 A2 discloses a method and an apparatus for segmenting a first region and a second region, wherein the method includes determining using a learning machine, based on one or more of the color arrangements, which pixels of the image satisfy criteria for classification as associated with the first region and which pixels of the image satisfy criteria for classification as associated with the second region.

William B. Kerr et al., "A Methodology and Metric for Quantitative Analysis and Parameter Optimization of Unsupervised, Multi-Region Image Segmentation", Proceeding of the 8th IASTED International Conference on Signal and Image Processing, 14 Aug. 2006, pp. 243-248, discloses the use of a methodology for quantitative analysis and parameter optimization of unsupervised, multi-region image segmentation, wherein the methodology is based on eight individual performance measures. A metric based on a statistical analysis of the overlap between machine segmented and corresponding ground truth images to evaluate and optimize algorithm parameters is disclosed, wherein inter-algorithm performance for unsupervised segmentation algorithms is compared.

Interactive image segmentation tools known in the art are, however, limited in their efficiency, since a large number of technical parameters often need to be selected and optimally adjusted. Moreover, the reliability of the segmentation results is often limited as well, for instance due to an inaccurate contour correction. This results in high costs due to further image segmentation as well as non-optimal radiation therapy treatment plans having fatal consequences.

SUMMARY OF THE INVENTION

It is an object of the present invention to provide a device, system and method for reliable, accurate and simple to operate interactive image segmentation of a subject.

In a first aspect of the present invention a device for segmenting an image of a subject is presented comprising a data interface for receiving an image of the subject and at least one contour or at least one part of a contour, the contour indicating a structure within the image, a selection unit for selecting a region in the image divided into a first and a second disjoint part by the contour or the part of the contour, the selected region comprising a drawn region and/or a computed region, a classifier for classifying the selected region based on at least one parameter for image segmentation, an analysis unit for defining an objective function based on the classification result, an optimizer for optimizing the parameter set by varying an output of the objective function and an image segmentation unit for segmenting the image using the optimized parameter set. Preferably, the classifier is configured to not classify the contour or the at least one part of the contour.

With the possibility of selecting a region in the received image, the user is able to interactively segment the image with a high degree of freedom and flexibility. In particular, in contrast to the technique disclosed in the afore-mentioned prior art, the present invention enables direct selection of a local region entirely based on the user's choice. Since the region is not generated by a device based on initial segmentation parameters, the user has direct influence on the correctness of the region selection. No initial segmentation parameters are needed and the risk of using wrong parameters is avoided. The present invention thus enables an efficient way of interactive image segmentation.

With the help of the given contour within the received image, structures of interest can be easily recognized which increases the efficiency of further proceeding of the image segmentation. By selecting a region which is divided into two disjoint parts by the given contour or part of contour and classifying the region, the present invention is able to optimize the image segmentation parameters locally for the purpose of a global image segmentation and/or a contour correction. In particular, the present invention differs from known image segmentation techniques, for instance the technique disclosed in the afore-mentioned prior art, by that the region chosen for parameter optimization lies in the vicinity of the given contour. This is advantageous since the segmentation parameters optimized in this way can be directly used to adjust the given contour or part of contour without or with minimum further adjustments. As a result, the interactive segmentation of the received image can be simplified.

The present invention is particularly advantageous for being used for radiation therapy planning Due to the complexity of anatomical structures of a patient, the surgical/ operating person carrying out a radiation therapy planning often requires an interactive image segmentation tool which is able to simultaneously adjust a large number of parameters. Radiation therapy planning systems known in the art are often equipped with complex graphical user interfaces which are difficult to understand. Further, parameter optimization and contour adjustments often require a lot of training of the operating person. With the help of the present invention, the operating person can select a region just using the mouse cursor of a computer and/or the user's finger or other means in conjunction with a touch screen. No complex graphical user interfaces are required and the surgical/ operating person does not need to be familiar with a lot of parameters in order to fulfill the task of image segmentation with a satisfying degree of reliability. Finally, by defining an objective function and by increasing the output of it, segmentation parameters can be optimized directly and precisely, independent on the actual algorithmic details of the objective function. The global segmentation of the image can thus be simplified while maintaining or even improving the segmentation quality.

In a preferable embodiment, the classifier is configured to classify said selected region into a first and a second image class. This has the advantage that the parameter set comprising at least one image segmentation parameter can be optimized locally with minimum computation amount.

In another preferable embodiment, the first image class is a major image class of the first disjoint part. Within the scope of the present invention, a major image class, representing essentially a subset of the image, is an image class which substantially characterizes an image or a part of it. This means that the classification is positive when an image or a part of it is classified into a major image class. Advantageously, the first disjoint part is classified correctly so that in further steps of image segmentation the computation amount for additional correction of the parameter set can be minimized.

In another preferable embodiment, the second image class is a major image class of the second disjoint part. Advantageously, the second disjoint part is classified correctly so that in further steps of image segmentation the computation amount for additional correction of the parameter set can be minimized, leading to fast and efficient image segmentation.

In another preferable embodiment, the optimizer is configured to determine a first area from the first disjoint part, the first area corresponding to the first image class. This embodiment is advantageous since the size of the first area in respect of the size of the first disjoint part is a measure of the agreement between the first disjoint part and the actual image details within the first disjoint part. The quality of the parameter set used to classify the selected region, in particular the first disjoint part, can thus be determined.

In another preferable embodiment, the optimizer is configured to determine a second area from the second disjoint part, the second area corresponding to the second image class. This embodiment is advantageous since the size of the second area in respect of the size of the second disjoint part is a measure of the agreement between the second disjoint part and the actual image details within the second disjoint part. The quality of the parameter set used to classify the selected region, in particular the second disjoint part, can thus be determined.

In another preferable embodiment, the objective function comprises a summation of the first and the second area. In this way, a highly reliable objective function is chosen so that the quality of the chosen parameter set can be determined with high accuracy. This is particularly the case when the first image class is a major image class of the first disjoint part and/or when the second image class is a major image class of the second disjoint part.

In another preferable embodiment, the optimizer is configured to maximize the output of the objective function. Advantageously, the parameter set can be optimized with maximum accuracy so that the image can be segmented with particularly high reliability.

In another preferable embodiment, the optimizer is configured to maximize the output of the objective function according to a ground truth classification of the first and/or the second disjoint part. With help of the ground truth classification, the first and/or second disjoint part of the selected region can be classified with high accuracy so that the result of the parameter optimization and consequently of the image segmentation is highly reliable.

In another preferable embodiment, the image segmentation unit is configured to adjust the contour or the part of the contour using the optimized parameter set. Advantageously, a contour correction is enabled using a simplified and intuitive interactive image segmentation technique.

In another preferable embodiment, the contour comprises a drawn contour and/or a computed contour and/or the selected region comprises a drawn region and/or a computed region. In this way, the present invention can be used independent on the type of the contour, so that the user flexibility is increased. Advantageously, the user is able to select a region for parameter optimization freely so that the interactive image segmentation is further simplified.

In a further aspect of the present invention a system for segmenting an image of a subject is presented comprising an imaging apparatus for generating at least one image of the subject and a device disclosed herein for segmenting the generated at least one image. The system according to the present invention has the advantage that it not only enables generating medical images but also interactive image segmentation which is more precise and reliable and simultaneously simplified compared to systems known in the art.

In another aspect of the present invention, a method for segmenting an image of a subject is presented comprising the steps of receiving an image of the subject and at least one contour or at least one part of a contour, the contour indicating a structure within the image, selecting a region in the image divided into a first and a second disjoint part by the contour or the part of the contour, the selected region comprising a drawn region and/or a computed region, classifying the selected region based on at least one parameter for image segmentation, defining an objective function based on the classification result, optimizing the parameter set by increasing or decreasing the objective function and segmenting the image using the optimized parameter set.

Using the method according to the present invention, interactive image segmentation can be easily applied to medical images of different types. An intuitive and simplified interactive image segmentation technique is thus enabled so that complex graphical user interfaces which are difficult to understand, cumbersome to use and require a lot of training can therefore be avoided.

In yet further aspects of the present invention, there are provided a computer program which comprises program code means for causing a computer to perform the steps of the method disclosed herein once the computer program is carried out on the computer as well as a non-transitory computer-readable recording medium that stores therein a computer program product, which, when executed by a device, causes the method disclosed herein to be performed.

Preferable embodiments of the invention are defined in the dependent claims. It shall be understood that the claimed system, method and computer program have similar and/or identical preferable embodiments as the claimed device and as defined in the dependent claims.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
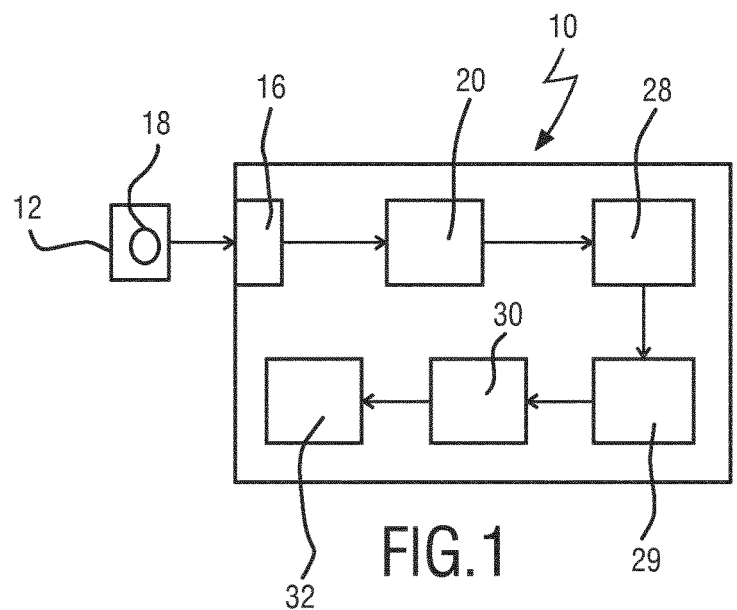
FIG. 1 shows a schematic block diagram of an embodiment of a device according to the present invention.

With reference to FIG. 1, a schematic block diagram of a device 10 for segmenting an image 12 of a subject 14 (FIG. 2) in accordance with an embodiment is shown. The device 10 comprises a data interface 16 for receiving the image 12 of the subject 14 and at least one contour 18, the contour 18 indicating a structure 19 (FIG. 4, dashed line), in particular relating to an anatomical structure of the subject 14. It is understood that although an entire contour is shown in FIG. 1, the present invention may also be used in conjunction with a part of a contour. The contour 18 may be drawn using a pen/pencil or generated by a machine, in particular by a computer. The data interface 16 can be any type of data interface known in the art, in particular data interface which connects an imaging apparatus and a device as disclosed herein. The types of the data interface 16 may include, without being limited to, Current Loop, RS-232, GPIB, V.35, etc.

The device 10 comprises a selection unit 20 for selecting a region 22 (FIG. 4) in the image 12 so that the region 22 is divided into a first disjoint part 23 and a second disjoint part 26 (FIG. 4) by the contour 18. In a preferable embodiment, the selection unit 20 comprises means for being used in combination with a mouse cursor and/or a monitor, so that a user can select the region 22 in the image 12 by moving the mouse cursor on the monitor. Alternatively, the user can select the region 22 in the image 12 by moving his finger or other means on a touch screen. The selection unit 20 may cooperate with existing image and/or text editing means such as image and/or text editing software(s).

The device 10 further comprises a classifier 28 for classifying the selected region 22 based on a parameter set comprising at least one image segmentation parameter. The parameter set may contain a plurality of image segmentation parameters, wherein the classifier 28 may apply the same or different image segmentation parameters to the first disjoint part 24 and the second disjoint part 26 of the selected region 22. In a preferable embodiment, the parameter set comprises a shape and/or appearance parameter, in particular a gray value transition and/or an image gradient and/or a curvature smoothness. This embodiment is advantageous, since a large number of different image segmentation parameters can be optimized so that the present invention is applicable to a large number of image types and/or anatomical structures. In another preferable embodiment, the classifier 28 selects one or more image segmentation parameters from external data entities such as databases, cloud systems, local communication networks, preferably via the data interface 16.

The device 10 further comprises an analysis unit 29 to determine the quality of the parameter set chosen for classifying the selected region 22. For doing so, the analysis unit 29 is configured to define an objective function. The analysis unit 29 may utilize one or more algorithms to define the objective function, such as a livewire algorithm, ground truth, 2D or 3D segmentation algorithms, machine learning, etc. In a preferable embodiment, the analysis unit 29 defines an objective function for the first disjoint part 24 and the second disjoint part 26 of the selected region 22, e.g. separately. In another preferable embodiment, the analysis unit 29 defines a unitary objective function for the selected region 22. The present invention is, however, not limited to these embodiments. In another preferable embodiment, the analysis unit 29 defines the objective function so that the objective function reflects how well the contour 18 corresponds to the structure within the region 22. In a further preferable embodiment, the objective function may relate to only one or a plurality of image segmentation parameters. In particular, the objective function may be defined based on one or more image segmentation parameters. In a preferable embodiment, the analysis unit 29 defines the objective function based on only one or a plurality of image classes.

The device 10 comprises an optimizer 30 for optimizing the parameter set by varying an output of the objective function. In a preferable embodiment, the optimizer 30 selects one or more algorithms for optimizing the parameter set from external data entities such as databases, cloud systems, Internet and/or local communication networks, preferably via data interface 16. In another preferable embodiment, the optimizer 30 increases or decreases the output of the objective function. In a further preferable embodiment, the optimizer 30 maximizes or minimizes the output of the objective function. In still a further preferable embodiment, the optimizer 30 is configured to apply a plurality of iterations, wherein the output of the objective function is varied by a fix or variable increment in each iteration.

The device 10 further comprises an image segmentation unit 32 for segmenting the image 12 using the optimized parameter set. In a preferable embodiment, the image segmentation unit 32 is used in conjunction with a mouse cursor or the user's finger and/or one or more image segmentation functions. The image 12 can be completely or partially segmented using the optimized parameter set. Preferably, the user may use the mouse cursor to select a part of the image 12 on a monitor which is segmented by the image segmentation unit 32 using the optimized parameter set. This may also be done by using the user's finger or other means to select a part of the image 12 on a touch screen.

Figure 2:
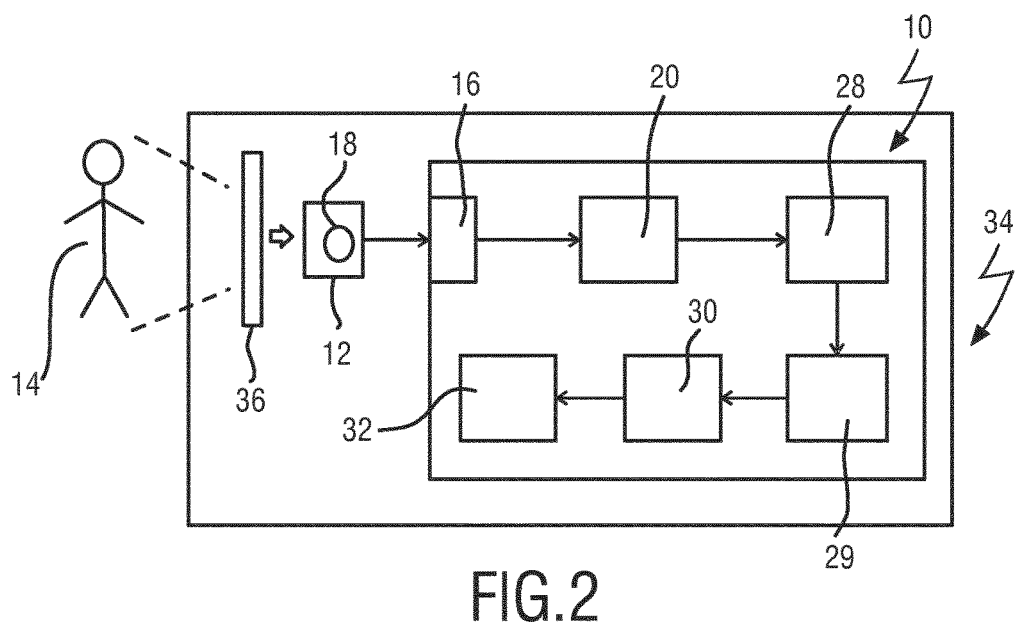
FIG. 2 shows a schematic block diagram of an embodiment of a system according to the present invention.

With reference to FIG. 2, a schematic block diagram of a system 34 for segmenting an image, in particular the image 12 of a subject in accordance with an embodiment is shown. The system 34 comprises an imaging apparatus 36 for generating at least one image 12 of the subject 14 and a device for segmenting images, in particular the device 10 in FIG. 1. The imaging apparatus 36 may comprise any type of imaging apparatus known in the field of medical imaging, which employ technologies such as X-ray, ultrasound, computed tomography (CT), magnetic resonance imaging (MRI), positron emission tomography (PET), endoscopic imaging, thermography, elastography and others. The imaging apparatus 36 may preferably be one that enables radiation therapy planning Preferably, the imaging apparatus 36 is one that enables optimization of dosimetry and/or brachytherapy such as HDR brachytherapy and/or LDR brachytherapy. In another preferable embodiment, the imaging apparatus 36 enables radiation therapy planning with one or more dose-volume histograms. The present invention is, however, not limited to these embodiments. It is noted that the dashed lines between the subject 14 and the imaging apparatus 36 are only for illustrative purpose and carry no technical feature. In particular, it is noted that the subject 14 can be captured by the imaging apparatus 36 entirely or partially.

Figure 3:
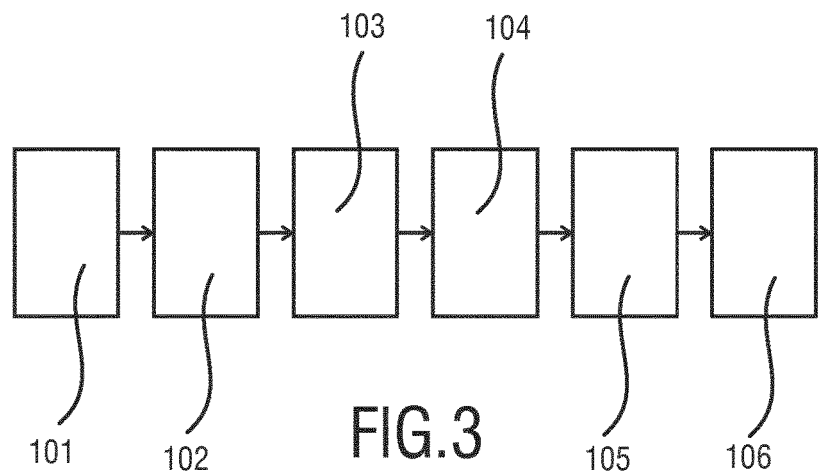
FIG. 3 shows an embodiment of a method according to the present invention.

With reference to FIG. 3, a schematic block diagram of a method for segmenting an image, in particular the image 12, of a subject, in particular the subject 14, in accordance with an embodiment of the present invention is shown. In a first step 101 of the method, the image 12 of the subject 14 and the contour 18 are received via the data interface 16. The contour 18 corresponds to a structure 19 (dashed line) within the image 12, wherein the structure typically relates to one or more anatomical structures/organs of a biological subject including human, mammals or other living beings. In a preferable embodiment, the image 12 and/or the contour 18 is stored in an internal or external memory unit in the first step 101. In a second step 102, a region being particularly the region 22 within the image 12 is selected so that the region 22 is divided into the first and the second disjoint part 24, 26 by the contour 18. In a preferable embodiment, the second step 102 of the method is carried out by a user, preferably in conjunction with a computer program. In a third step 103, the selected region 22 is classified based on a parameter set comprising at least one image segmentation parameter. Then, in a fourth step 104 an objective function is defined to determine the quality of the parameter set used to classify the selected region 22. In a fifth step 105, the parameter set is optimized by varying the objective function from the fourth step 104. In a sixth step 106, the parameter set optimized in the fifth step 105 is used for segmenting the image 12. It is understood that instead of an entire contour, a part of a contour may also be used by the method according to the present invention.

In all embodiments disclosed herein, the image segmentation unit 32 is preferably configured to adjust the contour 18 using the optimized parameter set. Preferably, the user selects one or more parts of the contour 18 using a mouse cursor, with which the user highlights the selected one or more parts. Further preferably, the user transfers the parameter set optimized for the selected region 22 to the one or more parts selected in the rest of the contour 18 by moving the mouse cursor to the one or more parts. The image segmentation unit 32 then applies the optimized parameter set to the selected one or more parts of the contour 18. In this way, an interactive image segmentation is realized which enables "copying and pasting segmentation properties", similar to text editing tools known in the art. The present invention may also be applied to segment the entire image 12 and/or to sequentially or simultaneously segment a plurality of images.

Figure 4:
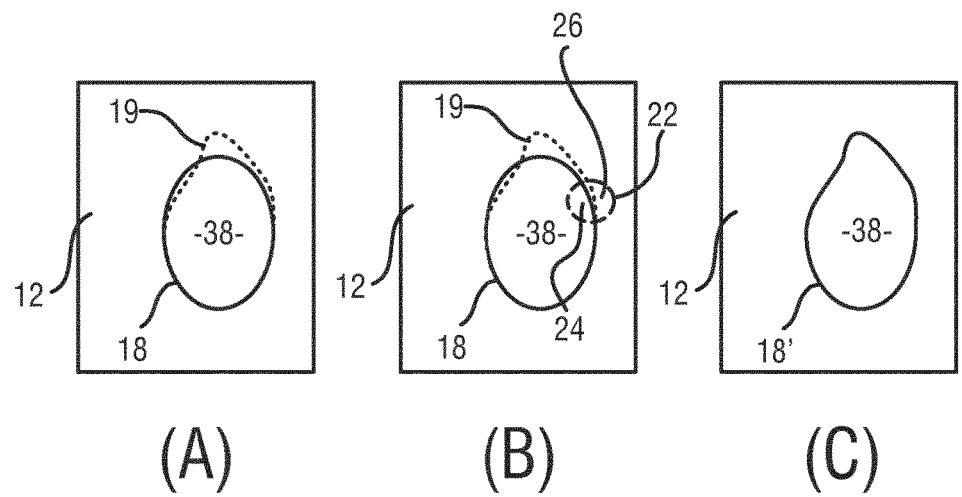
FIG. 4 shows an illustrative representation of images for use with an embodiment of the device of FIG. 1.

With reference to FIG. 4, an illustrative representation in accordance with an embodiment of the present invention is shown. FIG. 4A shows an image generated by an imaging apparatus known in the art, such as the imaging apparatus 36 according to the present invention. In the image 12, a contour 18 can be seen. Further, it can be seen from FIG. 4A that the contour 18 does not fully correspond to the structure 19 represented by dashed line.

FIG. 4B shows the image 12 which is treated using the present invention. The contour 18 encloses an area 38, which differs from the structure 19 in FIGS. 4A and B. A region 22 is selected in the vicinity of the contour 18, so that the region 22 is divided by the contour 18 into a first disjoint part 24 and a second disjoint part 26. The first disjoint part 24 lies within the area 38 and is enclosed by the contour 18 and the circumference of the region 22 while the second disjoint part 26 lies to the exterior of the area 38. After the region 22 has been selected, a parameter set is used to classify the region 22. The parameter set comprises one or more image segmentation parameters, in particular a gray value transition, an image gradient, a curvature smoothness or other shape and/or appearance parameter. In a preferable embodiment, the region 22 is classified into a first image class $C_A$ and a second image class $C_B$ based on a threshold parameter t. These may be performed using the following formula (1):

$$x \in \begin{cases} C_A : I(x) \geq t \\ C_B : I(x) < t \end{cases}$$

Here, I(x) is a function of image element x whose value is compared with the threshold parameter t. Preferably, the first image class is chosen to be the major image class or one of the major image classes substantially characterizing the structure 19. Further, the second image class may be chosen to be the major image class or one of the major image classes characterizing the region adjacent to the structure 19. For instance, if the structure 19 is a region of the human body substantially characterized by the image class cancer tissue, wherein the region adjacent to the structure 19 is substantially characterized by the image class healthy tissue, the first image class can be chosen to be a cancer tissue type, wherein the second image class may be chosen to be healthy tissue. This is, however, to be understood as an example of the choice of image classes without limiting the present invention in any way. In particular, more than two image classes may be chosen to classify the selected region 22.

Based on the classification of the selected region 22, an objective function can be defined which reflects the quality of the parameter set used to classify the region 22. In a preferable embodiment, the objective function can be a summation of a first and a second area, wherein the first area is the area of all image elements, in particular all pixels and/or voxels, within the first disjoint part 24 classified to the first image class. Further, the second area may preferably be the area of all image elements, in particular all pixels and/or voxels, within the second disjoint part 26 classified to be the second image class. This is, however not limiting the present invention. In particular, the objective function may be summation of the image elements from either the first area or the second area. Alternatively, the objective function may be a summation of the area of all pixels and/or voxels classified to be either the first image class or the second image class within the entire selected region 22. In another preferable embodiment, the objective function is defined based on the threshold parameter t of formula (1) according to formula (2):

$$S := \int_{x \in A \& I(x) \geq t} 1 dx + \int_{x \in B \& I(x) < t} 1 dx$$

Here, A represents the first disjoint part 24 and B represents the second disjoint part 26. Formula (2) represents an objective function as a summation of a first area of all image elements from the first disjoint part 24 which are simultaneously classified to the first image class $C_A$, and a second area of all image elements from the second disjoint part 26 which simultaneously are classified to the second image class $C_B$, using the classification according to formula (1).

In a next step, the parameter set chosen to classify the region 22 is optimized. In a preferable embodiment, the threshold parameter t as shown in formulas (1) and (2) is optimized by maximizing the sum S of the first area and the second area specified in formula (2), leading to formula (3):

$$t_{opt} := \underset{t}{\operatorname{argmax}} \left( \int_{x \in A \& I(x) \geq t} 1 dx + \int_{x \in B \& I(x) < t} 1 dx \right)$$

In this way, the threshold parameter t will be optimized so that an optimized threshold $t_{opt}$ is generated which maximizes the sum of the first and the second area as specified in formula (2). In another preferable embodiment, the threshold parameter t will be optimized to obtain the threshold $t_{opt}$ using a ground truth classification of the first disjoint part 24 and/or the second disjoint part 26. The present invention enables an easy and intuitive way of interactive image segmentation, with which the user is able to perform a local parameter optimization, preferably by simply choosing a region in the vicinity of a given contour using a mouse cursor shown on a monitor.

It is understood that instead of maximizing the objective function, the method, the device 10 and the system 34 may enable minimizing the output of an objective function to optimize the parameter set used to classify the selected region 22. For instance, the first image class may be a minor image class in respect of the first disjoint part 24 which does not substantially characterize the structure 19, while the second image class may be a minor image class in respect of the second disjoint part 26 which does not substantially characterize the region adjacent to the area 19. In this case, the threshold parameter t may be optimized by minimizing the sum of the first and the second area. In this way, the present invention may be used independently of the choice of parameter set or the result of classification of the region so that classification errors may be automatically corrected.

In a next step, the parameter set optimized for the selected region 22 from FIG. 4B is applied to adjust the rest of the contour 18. The result of this contour adjustment is illustratively shown in FIG. 4C. An adjusted contour 18' is shown which corresponds to the structure 19 significantly better than the contour 18 before adjustment. Similarly, the remaining image elements of the image 12 may also be segmented using the optimized parameter set.

It is noted that the images shown in FIG. 4A-C are all for illustrative purpose and do not claim the correctness of real images generated from a real subject.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. Device for segmenting an image of a subject, comprising:
   a data interface for receiving an image of said subject and at least one contour or at least one part of a contour, said contour indicating a structure within said image;
   a selection unit for selecting a region in said image divided into a first and a second disjoint part by said contour or said part of said contour, said selected region comprising a region drawn by a user and/or a region generated by a computer;
   a classifier for classifying said selected region into a first image class and a second image class based on at least one parameter for image segmentation;
   an analysis unit for defining an objective function based on at least one of said first is a class and said second image class;
   an optimizer for optimizing said at least one parameter by varying an output of said objective function; and
   an image segmentation unit for segmenting said image using said optimized at least one parameter;
   wherein said selection unit is configured to select said region to divide said contour into a first contour part within said region and a second contour part outside said region, and
   wherein the image segmentation unit is configured to transfer said at least one parameter optimized for said region to at least one part selected in said second contour part.

2. The device according to claim 1, wherein said first image class is a major image class of said first disjoint part.

3. The device according to claim 1, wherein said second image class is a major image class of said second disjoint part.

4. The device according to claim 1, wherein said optimizer being configured to determine a first area from said first disjoint part, said first area corresponding to said first image class.

5. The device according to claim 4, wherein said objective function comprises a summation of said first and said second area.

6. The device according to claim 1, wherein said optimizer being configured to determine a second area from said second disjoint part, said second area corresponding to said second image class.

7. The device according to claim 1, wherein said optimizer is configured to maximize said output of said objective function.

8. The device according to claim 7, wherein said optimizer is configured to maximize said output of said objective function according to a ground truth classification of said first and/or said second disjoint part.

9. The device according to claim 1, wherein said image segmentation unit is configured to adjust said contour or said part of said contour using said optimized parameter set.

10. The device according to claim 1, wherein said contour or said part of said contour comprises a drawn contour or a drawn part of contour and/or a computed contour.

11. System for segmenting an image of a subject, comprising:
an imaging apparatus for generating at least one image of said subject; and
a device claimed in claim 1 for segmenting said generated at least one image.

12. A method for segmenting an image of a subject, comprising the steps of:
receiving an image said subject and at least one contour at least one part of a contour, said contour indicating a structure within said image;
selecting a region in said image divided into a first and a second disjoint part by said contour or said part of said contour, said selected region comprising a region drawn by a user and/or a region generated by a computer;
classifying said selected region into a first image class and a second image class based on at least one parameter for image segmentation;
defining an objective function based on at least one of said first image class and said second image class;
optimizing said at least one parameter by varying an output of said objective function; and
segmenting said image using said optimized at least one parameter;
wherein said method further comprises the steps of selecting said region to divide said contour into a first contour part within said region and a second contour part outside of said region and transferring said at least one parameter optimized for said region to at least one part selected in said second contour part.

13. Computer program comprising program code means for causing a computer to carry out the steps of the method as claimed in claim 12 when said computer program is carried out on the computer.

* * * * *